United States Patent
Goossens

(10) Patent No.: US 7,857,282 B2
(45) Date of Patent: Dec. 28, 2010

(54) SOLENOID VALVE

(75) Inventor: Andre F. L. Goossens, Rumst (BE)

(73) Assignee: Continental Teves AG & Co., oHG, Frankfurt (DE)

( * ) Notice: Subject to any disclaimer, the term of this patent is extended or adjusted under 35 U.S.C. 154(b) by 265 days.

(21) Appl. No.: 10/543,955

(22) PCT Filed: Dec. 17, 2003

(86) PCT No.: PCT/EP03/14392

§ 371 (c)(1), (2), (4) Date: Aug. 1, 2005

(87) PCT Pub. No.: WO2004/069622

PCT Pub. Date: Aug. 19, 2004

(65) Prior Publication Data

US 2006/0124882 A1 Jun. 15, 2006

(30) Foreign Application Priority Data

| Feb. 5, 2003 | (DE) | ................................. 103 04 766 |
| Mar. 21, 2003 | (DE) | ................................. 103 12 559 |
| Jul. 15, 2003 | (DE) | ................................. 103 32 345 |

(51) Int. Cl.
*F16K 31/02* (2006.01)

(52) U.S. Cl. ............................ 251/129.07; 251/129.02; 251/129.19

(58) Field of Classification Search ............ 251/129.02, 251/129.07, 129.15, 129.19, 84, 85, 86, 87
See application file for complete search history.

(56) References Cited

U.S. PATENT DOCUMENTS

| 2,735,047 A | * | 2/1956 | Garner et al. ................ 335/245 |
| 3,671,009 A | * | 6/1972 | Stampfli ................. 251/129.07 |
| 3,829,060 A | * | 8/1974 | von Lewis ............. 251/129.02 |
| 4,771,983 A | | 9/1988 | Sakaguchi et al. |
| 4,911,405 A | * | 3/1990 | Weissgerber ........... 251/129.14 |
| 5,011,114 A | * | 4/1991 | Depuydt et al. ............. 251/144 |
| 5,167,442 A | * | 12/1992 | Alaze et al. ............. 303/113.2 |
| 5,344,118 A | | 9/1994 | Kamiya et al. |

FOREIGN PATENT DOCUMENTS

| DE | 2052307 | 5/1972 |
| DE | 2208183 | 8/1973 |
| DE | 10117608 | 5/2002 |
| DE | 10151808 | 10/2002 |
| DE | 10200915 | 10/2002 |
| GB | 2204381 | 11/1988 |

* cited by examiner

Primary Examiner—John K Fristoe, Jr.

(57) ABSTRACT

A solenoid valve has a valve closure member (5) which is positioned in a self-centering manner about a center of rotation (D) between the valve tappet (4) and the valve seat (14).

3 Claims, 1 Drawing Sheet

SOLENOID VALVE

BACKGROUND OF THE INVENTION

The present invention relates to a solenoid valve with a valve housing receiving a valve closure member that cooperates with a valve tappet and a magnet armature, with the valve closure member being movable to rest on a valve seat and the magnet armature being movable to rest on a magnet core, with a valve housing in which the magnet armature is axially movably guided, and with a magnet coil arranged at the periphery of the valve housing for the purpose of energizing the magnet armature to adopt a switch position in which the valve closure member is able to close the pressure fluid connection between at least one pressure fluid inlet channel and one pressure fluid outlet channel in the valve housing in opposition to the effect of a valve spring.

In a prior art solenoid valve of the type indicated (DE 101 17 608 A1), the valve closure member is designed as a valve piston which must be guided precisely along its peripheral surface in the valve housing. This necessitates close tolerances of fit and an exact alignment of the valve seat in relation to the valve closure member. Further, it is sophisticated that the magnet armature must be designed so as to be removable for inserting the valve seat, the sealing ring and the parts associated with the sealing ring into the valve housing.

In view of the above, an object of the invention is to provide a solenoid valve which does not suffer from the above-mentioned drawbacks.

SUMMARY OF THE INVENTION

According to the invention, this object is achieved for a solenoid valve of the indicated type by arranging the valve closure member in a self-centering manner around a point of rotation between the valve tappet and the valve seat.

Further features, advantages and possible applications of the invention become apparent from the description of an embodiment.

DETAILED DESCRIPTION OF THE DRAWING

Figure 1:
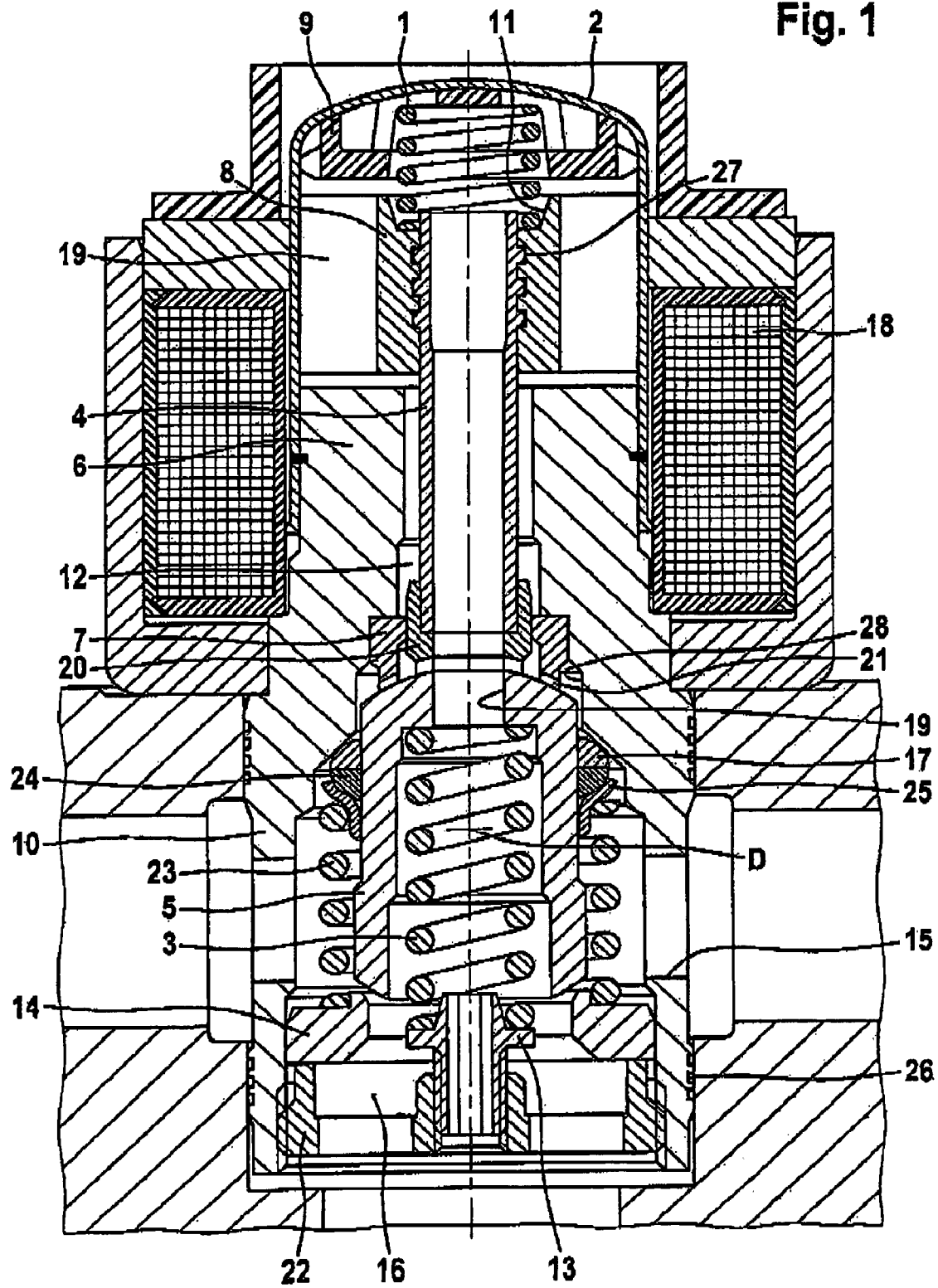
FIG. 1 shows a cross-sectional view of a solenoid valve configured as a two-way/two-position seat valve.

The solenoid valve includes a valve housing 10 designed in a cartridge-type construction and being preferably made of corrosion-resistant steel. In terms of manufacturing technique, valve housing 10 is preferably designed as a turned part in conformity with the demands of automation and is fastened in a valve block by means of a press fit engagement. In order to realize a uniform pressing force and proper sealing of the valve housing 10 in the valve block, the valve housing 10 has circumferential flutes 26 at its periphery, grooves, or saw teeth. In addition, the flutes 26 allow durably depositing the wear particles being produced in the pressing operation in the flutes 26 so that contamination of the channels in the valve housing 10 is prevented. The mid-portion of the valve housing 10 is configured as a tubular magnet core 6, with the result that the magnet core 6 together with the valve housing 10 forms a one-part assembly. An extremely thin-walled sleeve 2, which is preferably deepdrawn and closed like a bowl in the end section, is seated on the magnet core 6. Sleeve 2 accommodates in its end section a massive end plate 9 and forms the top part for closing the valve housing 10. End plate 9 dampens the stop noise of the magnet armature 8, on the one hand, while, on the other hand, the gas contained in the pressure fluid can collect in a chamber of the sleeve 2 formed by the end stop 9 so that lubrication of the moved magnet armature 8 by means of the pressure fluid is constantly ensured. This is because if the gas collected in the sliding area of the magnet armature 8, the lubricating film would be interrupted, and undesirable armature wear would be imminent.

The magnet armature 8 movably arranged below the end plate 9 in the sleeve 2 is connected to a tubular valve tappet 4 introduced into a stepped bore 11 of the magnet armature 8. A particularly simple, yet nevertheless reliable connection between the magnet armature 8 and the valve tappet 4, according to the invention, is achieved in that a mandrel introduced from above into the hollow valve tappet 4 is used to radially expand the wall of the valve tappet 4 so that the wall of the valve tappet 4 is displaced into the transverse flutes 27 of the magnet armature 8. This attachment can be employed in a favorable manner when the material of the valve tappet 4 is softer than the material of the magnet armature 6. In addition, the proposed attachment safeguards a simple, precise adjustment of the residual air slot between the magnet armature 8 and the magnet core 6 so that the desired constant electromagnetic properties can be maintained independently of manufacturing tolerances.

Arranged between the magnet armature 8 and the end plate 9 in the magnet armature chamber is a resetting spring 1 which is guided in sections for the reliable alignment in the stepped bore 11. Succeeding the connection composed of the magnet armature 8 and valve tappet 4 is a piston-shaped valve closure member 5 which, just as the valve tappet 4, is disposed within the centrally positioned through-bore 12 of the valve housing 10. To this end, the through-bore 12 is designed as a stepped bore which, in its bottom expanded stepped portion, accommodates the valve closure member 5 and, on top thereof, a bushing 7 fastened in the stepped bore. For the purpose of centering the tappet, the bushing 7 is adapted in its inside diameter either directly to the outside diameter of the valve tappet 4 or, according to the illustrated design, to a bowl 20 secured to the tappet end. Bowl 20 is composed of a material that is harder compared to the material of the valve tappet or, respectively, a material whose surface is hardened. Bowl 20 is press fitted on the end of the valve tappet 4 that faces the valve closure member 5.

Valve tappet 4 is composed of a material with a low density, in particular light metal (aluminum, magnesium) or plastics. This light-weight tappet material permits reducing the moved masses and has resilient properties which allow properly mastering the impulse forces and, thus, mechanical stress. Besides, the proposed construction of the valve components performing a translation movement allows a generously sized pressure compensating bore 19 ensuring a valve operation independent of pressure variations.

The use of ceramics, not only for the valve closure member 5 but also for the valve seat 14, provides an optimal precondition for an almost wear-free operation of the solenoid valve.

The curved piston portion of the valve closure member 5 is supported on the bushing 7 in the de-energized valve switching position. To establish a press fit connection with the valve housing 10, the outside diameter of the bushing 7 is adapted to the inside diameter in the expanded portion of the stepped bore 28, to what end the stepped bore 28, when desired or required, is furnished with flutes, channels, threads, or like indentations, in order to safeguard the continuity of the press-in force that has been mentioned hereinabove.

Under the effect of a valve spring 3, the valve closure member 5 rests in the open, electromagnetically non-energized position on the end surface of the bushing 7 which in the area of contact with the valve closure member 5, exactly as the bottom of bowl 20, includes recesses 21 for the propagation of pressure fluid in the direction of the magnet armature chamber.

Suitably, the valve spring 3 is biased by means of a spring stop 13 that is inserted from below into the opening of the valve housing 10 and is adjustable by means of a thread also within a valve seat stop 22. The valve seat stop 22 designed as a massive perforated disc has at its periphery an outside thread being in engagement with an inside thread at the bottom end of the valve housing 10 so that the valve seat stop 22 is screwed from below into the valve housing 10 until it contacts the annular-disc shaped valve seat 14. It is thus ensured that the valve seat 14 pressured from below into the valve housing 10, under the effect of the high hydraulic pressure, cannot detach itself from its adjusted press fit engagement with the valve housing 10. In the type of a setscrew, the tubular spring stop 13 is positioned centrally in a centrally disposed threaded bore of the valve seat stop 22.

The biasing force of the valve spring can be adjusted precisely upon electromagnetic energization in the valve's closing position by turning the spring stop 13 in the valve seat stop 22. For the precise guiding, the helical valve spring 3 is received with its one end within the tubular valve closure member 5, while the other end of the valve spring 3 is supported on a collar of the spring stop 13. The tubular form of the valve closure member 5 stepped in its inside diameter thus allows a safe, compact accommodation and support of individual spring coils of the valve spring 3 without inhibiting the hydraulic pressure compensation in the valve housing 10.

At the level of the valve closure member 5 and, hence, above the valve seat 14, the valve housing 10 is horizontally penetrated by a pressure fluid inlet channel 15 which, in the open valve switching position as shown in the drawing, is connected via the open valve seat 14, the punched valve seat stop 22 and the through-bore in the spring stop 13 to the pressure fluid outlet channel 16 that opens from below vertically into the valve housing 10.

The solenoid valve is hydraulically pressure-balanced, to what end a concentric, spring-loaded back ring 17 is arranged at the outside periphery of the valve closure member 5, said back ring being pressed by a spring 23 supported on the valve seat 14 from below, through a spring plate 25 and a sealing ring 24, against a conical portion of the stepped bore 28. With its spherical outside shoulder, the back ring 17 is supported on the conical inside wall of the stepped valve housing 10, with the result that the valve closure member 5 guided within the sealing and back ring 24, 17, similar like in a ball cup, can tiltably move to all sides in the valve housing 10 to a limited extent. In order that also the sealing ring 24 is able to follow a tolerance-induced inclined position of the spring 34 in a low-resistance manner, the sealing ring is likewise shaped spherically in the direction of the funnel-shaped spring plate 25. The spherical surfaces of the back ring 17 and the sealing ring 24 are the surfaces remote from each other, while the surfaces of back ring and sealing ring 17, 24 that abut on each other are plane surfaces. Spring 23 ensures both an axial and a radial action of force at the sealing ring 24 in order to safeguard the sealing effect of the sealing ring 24 even at low hydraulic pressures. The mentioned radial preloading force is further needed in order to compensate the radial thermal expansions of the valve components. With increasing hydraulic pressure in the pressure fluid inlet channel 15, advantageously, self-boosting of the sealing effect of the sealing ring 24 is achieved. The sealing ring 24 is made of plastics, while the back ring 17 is configured as a metal ring. Due to the described design, back ring 17 in addition fulfills favorably a static sealing function at the conical inside sealing surface of the valve housing 10.

In order that a sufficient freedom of motion is ensured likewise in the contact area between the valve closure member 5, the bushing 7, and the bowl 20 for tilting the valve closure member 5, the contact surfaces disposed between the bushing 7, the bowl 20 and the valve closure member 5 also have a spherical contour that is preferably shaped as a spherical segment.

The point of rotation D for tilting the piston-shaped valve closure member 5 is thus disposed on the axis of symmetry of the solenoid valve roughly at half the level of the valve closure member 5. The described articulated support and sealing of the valve closure member 5 in the valve housing 10 will thus safeguard a simple and precise self-centering of the valve closure member 5 at the funnel-shaped sealing seat of the valve seat 14. The funnel angle of the valve seat 14 is adapted to the spherical sealing surface of the valve closure member 5, that is preferably shaped as a spherical segment, and the funnel angle at the valve seat 14 is chosen to be such that in the case of wear of the sealing edge of the valve seat 14, the mean sealing diameter remains as unchanged as possible in order to thus maintain the exact hydraulic pressure compensation of the solenoid valve without changes even during long-term operation.

To reduce the hydraulic resistance, the magnet armature 8, the valve tappet 4, and the valve closure member 5 are penetrated by several pressure compensating bores 19 in parallel to the valve's axis of symmetry. The pressure fluid flowing into the pressure fluid outlet channel or pressure fluid inlet channel 16, 15 is thus not hindered to propagate through the pressure compensating bore 19 that penetrates the valve closure member 5, the valve tappet 4 and the magnet armature 8, into the magnet armature chamber and, hence, to the end section of the sleeve 2 so that an almost constant switching characteristics of the solenoid valve is favorably ensured irrespective of pressure and temperature differences of the fluid.

The following description briefly illustrates the mode of operation of the solenoid valve with the features essential for the invention. In the illustration according to FIG. 1, the solenoid valve adopts the electromagnetically non-energized, open basic position in which an unhindered pressure fluid connection between the pressure fluid inlet channel 15 and the pressure fluid outlet channel 16 is ensured due to the valve closure member 5 that has lifted from the valve seat 14. In this basic position, the end surface of the valve closure member 5 remote from the valve seat 14, under the effect of the valve spring 3, rests on the end surface of the bushing 7. Bushing 7 is arranged in the through-bore 12 of the magnet core 6 in such a fashion that in the open valve position, the magnet armature 8 attached to the valve tappet 4 is remote from the magnet core 6 by at least a rate corresponding to the valve stroke. In the open valve position, the end surface of the magnet armature 8 remote from the magnet core 6 is hence equally spaced a defined axial distance from the end plate 9 at the dome-shaped portion of the sleeve 2, whereby a so-called damping stroke of the magnet armature 8 is rendered possible to be able to slow down the magnet armature 8 according to the following description of functioning after the demagnetization.

Initially, however, when the electromagnetic energization of the valve occurs, the valve closure member 5 moves away from the bushing 7 in a downward direction and, due its tiltability, in a self-centering manner comes into abutment on the valve seat 14. During this operation, the resetting spring 1 will automatically be relieved and, compared thereto, the valve spring 3 is preloaded in proportion to the valve stroke until the magnetic field of the magnet coil 18 collapses after deactivation of the electromagnetic energization (demagnetization). Thereafter, the valve spring 3 which is stiffer compared to the resetting spring 1 becomes effective in the sense of valve opening, accelerating the valve closure member 5, the bowl 20, the valve tappet 4 and the magnet armature 8 in opposition to the effect of the initially weak resetting spring 1 in the direction of the end plate 9. This acceleration of the total mass comprising the valve closure member 5, the bowl 20, the valve tappet 4, and the magnet armature 8 advantageously takes place only until the valve closure member 5 has moved into abutment on the bushing 7 so that the force of the valve spring 3 which was originally active on the valve tappet 4, the bowl 20 and the magnet armature 8 will only act on the valve closure member 5 that came to rest on the bushing 7. Consequently, it will only be the mass of magnet armature, bowl and valve tappet, reduced by the mass of the valve closure member 5, that will continue to move due its mass inertia in opposition to the stroke-proportionally rising force of the resetting spring 1 in the direction of the end plate 9. With increasing compression of the resetting spring 1 and in consideration of the viscous damping of the pressure fluid disposed in the magnet armature chamber, the magnet armature 8 and the valve tappet 5 are decelerated during the damping stroke until standstill shortly before the end plate 9 or under extremely unfavorable conditions (dry operation, frothed fluid) directly on the end plate 9, with a subsequent reversal of the direction of motion of the magnet armature 8 and valve tappet 4, initiated by the resetting spring 1, into the rest position according to the drawing, where the valve tappet 4 abuts on the valve closure member 5 again. As this occurs, it must be taken into consideration that the impulse force acting in the direction of the end plate 9 and, after the reversal of movement, in the direction of the valve closure member 5 as well as the noise of impact will be reduced considerably due to the resilient properties of the valve tappet 4.

LIST OF REFERENCE NUMERALS 1 resetting spring
2 sleeve
3 valve spring
4 valve tappet
5 valve closure member
6 magnet core
7 bushing
8 magnet armature
9 end plate
10 valve housing
11 stepped bore
12 through-bore
13 spring stop
14 valve seat
15 pressure fluid inlet channel
16 pressure fluid outlet channel
17 back ring
18 magnet coil
19 pressure compensating bore
20 bowl
21 recess
22 valve seat stop
23 spring
24 sealing ring
25 spring plate
26 flute
27 transverse flute
28 stepped bore

The invention claimed is:

1. A solenoid valve, with a pressure fluid Inlet channel and a pressure fluid outlet channel within a valve housing receiving a valve closure member that cooperates with a valve tappet and a magnet armature to control a pressure fluid connection between the inlet channel and the outlet channel, with the valve closure member being movable to rest on a valve seat and the magnet armature being movable to rest on a magnet core and being axially movably guided within the valve housing, with a valve spring biasing the valve member away from the valve seat, and with a magnet coil arranged at the periphery of the valve housing for the purpose of energizing the magnet armature to adopt a switch position in which the valve closure member is able to close the pressure fluid connection In the valve housing in opposition to the effect of the valve spring, wherein valve closure member (5) is arranged in a self-centering manner around a point of rotation (D) between the valve tappet (4) and the valve seat (14), wherein the valve closure member (5) has a tubular design, and the point of rotation (D) is positioned within the valve closure member (5) on the axis of rotational symmetry of its body, and wherein the valve closure member (5) includes at its outside periphery a back ring (17) which swivels about the point of rotation (D) synchronously with a self-centering tilting movement of the valve closure member (5) and seals the valve closure member (5) along its periphery in the valve housing (10).

2. The solenoid valve as claimed in claim 1, wherein the back ring (17) includes an outside shoulder shaped as a section of a sphere defined by its radius around the point of rotation (D) and wherein the valve housing (10) comprises a conical inside wall abutted by the shoulder.

3. The solenoid valve as claimed in claim 2, wherein between the back ring (17) and the conical inside wall of a spring plate (25), a sealing ring (24) is axially and radially preloaded by means of a spring (23) that is supported on the valve seat (14).

* * * * *